(No Model.)

D. A. ROOT.
ROLLER SKATE.

No. 353,644. Patented Nov. 30, 1886.

Attest:
E. F. Scully
A. Barthel

Inventor
Dexter A. Root.
By Thos. S. Sprague
Att'y.

UNITED STATES PATENT OFFICE.

DEXTER A. ROOT, OF SOUTH BAY CITY, MICHIGAN.

ROLLER-SKATE.

SPECIFICATION forming part of Letters Patent No. 353,644, dated November 30, 1886.

Application filed September 30, 1886. Serial No. 214,964. (No model.)

*To all whom it may concern:*

Be it known that I, DEXTER A. ROOT, of South Bay City, in the county of Bay and State of Michigan, have invented new and useful Improvements in Roller-Skates; and I do hereby declare that the following is a full, clear, and exact description thereof, reference being had to the accompanying drawings, which form a part of this specification.

This invention relates to certain new and useful improvements in roller-skates; and the invention consists in the peculiar construction and arrangement of parts, whereby a central bearing is provided upon friction-rollers; in the means employed for taking up lost motion caused by wear, and in the peculiar construction, arrangement, and combinations of the various parts, all as more fully hereinafter set forth.

Figure 1:
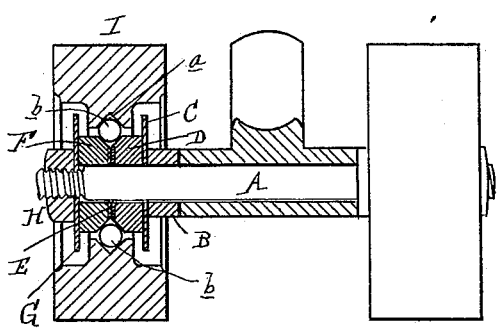
Figure 2:
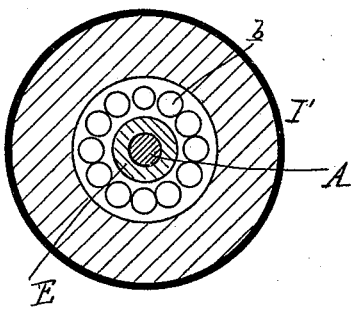

Figure 1 is a central vertical cross-section through one roller in the longitudinal direction of the axle. Fig. 2 is a similar view at right angles to Fig. 1.

In the accompanying drawings, which form a part of this specification, A represents the axle, which passes through the bracket of a roller-skate, as in the usual manner, and threaded upon its outer end.

B is a collar, which slips over the axle and lies against the edge of the bracket.

C is a sheet-metal washer; D, a conical bushing; E, a number of thin washers; F, a conical bushing; G, a sheet-metal washer, each slipped over the axle in the order given, and held in place thereon by a nut, H, upon the end of the axle.

I represents the roller, which is provided with a central internal annular flange or channel, a, in which are placed a series of steel anti-friction rollers, b, and which, when the roller is in position, as shown in the drawings, rest and rotate within the annular space between the conical ends of the bushings D and F.

By this construction and arrangement of parts it will be seen that the axle is prevented from turning without pinning through the bracket, as the end strain (both ends of the axle being provided with the same devices) will be such as to bind the axle, while the roller is free to rotate upon the steel friction-roller, and that a central bearing is provided for the roller, materially reducing the friction.

Any lost motion that may be occasioned by the wear of the parts can readily be taken up by simply removing one or more of the thin washers E, which will allow the conical bushings to come closer together.

I am aware of the patent to L. M. Richardson, No. 308,990, of December 9, 1884, wherein a double series of anti-friction rollers are used, but wherein there is no provision made for taking up lost motion, nor for preventing the turning of the axle; and hence I do not, broadly, claim the employment in a roller-skate of such anti-friction rollers.

What I claim as my invention is—

1. In a roller-skate, the combination, with the axle and skate-bracket, of the skate-roller formed with internal annular channel, conical bearings within said roller, washers between said bearings, and a nut upon the end of said axle, substantially as and for the purpose specified.

2. In a roller-skate having anti-friction bearings, an axle-bearing in two parts, forming a groove between them, and provided with intermediate washers, substantially as described.

3. In a roller-skate, the combination, with the axle and skate-bracket, of the skate-roller formed with internal annular channel, conical bearings in said roller, washers between said bearings, washers C G upon opposite sides of said bearings, the collar B on the axle between the washer C and the bracket, and the adjusting-nut on the end of the axle, substantially as and for the purpose specified.

DEXTER A. ROOT.

Witnesses:
THOMAS W. ROBERTS,
JOHN F. KAEKEL.